United States Patent [19]

Jialanella et al.

[11] Patent Number: 5,461,106
[45] Date of Patent: Oct. 24, 1995

[54] LATENT INITIATOR OF N-BASE ACID SALT-CONTAINING EMULSION POLYMER

[75] Inventors: Gary L. Jialanella; Dwight K. Hoffman, both of Midland, Mich.

[73] Assignee: The Dow Chemical Company, Midland, Mich.

[21] Appl. No.: 353,850

[22] Filed: Dec. 12, 1994

[51] Int. Cl.$^6$ .................. C08F 220/06; C08F 222/02
[52] U.S. Cl. .................. 524/560; 524/556; 524/561; 523/411; 525/329.5; 525/329.9
[58] Field of Search .................. 525/329.5, 329.9; 523/411, 412; 524/556, 560, 561

[56] References Cited

U.S. PATENT DOCUMENTS

| | | | |
|---|---|---|---|
| 2,146,209 | 2/1938 | Graves | 525/330.5 |
| 3,018,258 | 1/1962 | Meier et al. | 260/6 |
| 3,018,262 | 1/1962 | Schroeder | 260/29.2 |
| 3,553,166 | 1/1971 | Anderson et al. | 260/47 |
| 4,101,514 | 7/1978 | Thom | 528/109 |
| 4,225,460 | 9/1980 | Newell | 252/429 R |
| 4,503,161 | 3/1985 | Korbel et al. | 525/524 |
| 4,609,692 | 9/1986 | Huybrechts et al. | 523/400 |
| 4,988,759 | 1/1991 | Den Hartog et al. | 524/547 |
| 5,176,942 | 1/1993 | Burba et al. | 525/502 |

FOREIGN PATENT DOCUMENTS 3-33174  2/1991  Japan.

*Primary Examiner*—Robert E. Sellers

[57] ABSTRACT

A solid polymeric latent initiator which is a dehydrated aqueous emulsion polymer of a monomer having an ethylenically unsaturated group and an organic salt group, the salt group being a product of an acid and a base, wherein either the acid or the base or the acid and the base are initiators capable of opening a strained heterocyclic ring system, provides rapid cure-on-demand one-part adhesives with improved shelf stability.

11 Claims, No Drawings

LATENT INITIATOR OF N-BASE ACID SALT-CONTAINING EMULSION POLYMER

BACKGROUND OF THE INVENTION

This invention relates to a solid latent polymeric initiator. This initiator is useful for one-part cure-on-demand systems.

It is well known that the polymerization of oxiranes and similar strained heterocyclic groups can be initiated by nucleophiles, such as nitrogen-containing nucleophiles. For example, imidazole and its substituted derivatives have been investigated as initiators (i.e., curing agents) for epoxy resins and have been found to produce cured resins with good properties. (See for example, Paul F. Bruins, Ed., "Epoxy Resin Technology", Interscience Publishers, New York (1968), incorporated herein by reference.)

Ordinarily, imidazoles are not considered latent initiators because the unshared electron pair on the nitrogen groups are quite reactive with oxiranes even at ambient temperatures. Therefore, it has been found necessary to complex or encapsulate imidazoles to provide latency. Examples of latency provided by complexation can be found in German Offenlegungsschrift 1,904,641 (published Nov. 6, 1969, incorporated herein by reference), which discloses a class of curing agents obtained by reacting imidazoles with metal salts to form metal salt complexes of imidazoles; and U.S. Pat. No. 4,101,514, incorporated herein by reference, which describes metal perfluoralkylsulfonateimidazole type latent curatives which controllably initiate ring-opening reactions of a strained heterocyclic ring.

U.S. Pat. No. 3,018,258 (incorporated herein by reference) discloses coating epoxide-reactive materials with an inactive gelatin. U.S. Pat. Nos. 4,225,460 and 4,503,161 (incorporated herein by reference), disclose microencapsulating Lewis acid initiators with various inert polymers.

There remains a need for inexpensive, easily prepared latent initiators which provide rapid cure-on-demand one-part adhesives with improved shelf stability.

SUMMARY OF THE INVENTION

The present invention is a solid polymeric latent initiator which is a dehydrated aqueous emulsion polymer of a monomer having an ethylenically unsaturated group and an organic salt group, the salt group being a product of an acid and a base wherein either the acid or the base or the acid and the base are initiators capable of opening a strained heterocyclic ring system.

Another aspect of the present invention is a cure-on-demand composition comprising:

a) a strained heterocyclic ring compound; and b) a solid polymeric latent initiator which is a dehydrated aqueous emulsion polymer of a monomer having an ethylenically unsaturated group and an organic salt group, the salt group being a product of an acid and a base wherein either the acid or the base or the acid and the base are initiators capable of opening a strained heterocyclic ring system.

A further aspect of the present invention is an aqueous emulsion copolymer of an acrylate or a methacrylate, and a salt of an acrylic acid or a methacrylic acid and an imidazole.

The present invention provides a latent initiator which is useful for improving the shelf-life of a one-part epoxy adhesive.

DETAILED DESCRIPTION OF THE INVENTION

The polymeric latent initiator of the present invention is prepared by emulsion polymerization of a monomer containing an ethylenic unsaturated group and a salt group containing a rapidly releasable initiator. The salt group of the monomer is the product of an acid and a base, wherein either the acid or the base, or both the acid and the base are initiators capable of opening strained heterocyclic ring systems such as oxiranes.

Preferably, the salt group of the monomer is derived from a nitrogen-containing base, such as an amine, a urea, or an imidazole; and an organic acid, such as a carboxylic acid, a sulfonic acid, or a thiol. Imidazoles and amines are preferred nitrogen-containing bases, with imidazoles being more preferred. Carboxylic acids and thiols are preferred acids.

Preferred imidazoles include imidazole, 2-methyl imidazole, 2-ethyl imidazole, 2-ethyl-4-methyl imidazole, 2,4-dimethyl imidazole, 2,4-diethyl imidazole, 2,4,5-triethyl imidazole, 2-benzyl imidazole, 2-benzyl, 4-methyl imidazole, 2-phenyl imidazole, and 2-vinyl imidazole. More preferred is 2-methyl imidazole.

The monomer is preferably an imidazolium salt or a quaternary ammonium salt, more preferably an imidazolium salt, of a vinyl carboxylic acid, such as acrylic acid, fumaric acid, itaconic acid, maleic acid, or methacrylic acid. More preferably, the monomer is an imidazolium salt of methacrylic acid, most preferably a salt of methacrylic acid and 2-methyl imidazole.

The solid polymeric latent initiator of the present invention can be formed by way of any emulsion polymerization process, including conventional emulsion polymerization processes. (See for example, Odian in "Principles of Polymerization", 2nd Edition, John Wiley & Sons, New York, pp. 319–325, (1981), incorporated herein by reference.) The monomer is emulsion polymerized, preferably in the presence of a comonomer which contains an ethylenically unsaturated group. Preferred comonomers include acrylates, acrylamides, acrylonitriles, styrenes, vinyl naphthalenes, N-vinyl carbazoles and N-vinyl pyrrolidones. More preferred comonomers include methyl methacrylate, acrylamide, methacrylamide, acrylonitrile, methacrylonitrile, styrene, and α-methyl styrene. Methyl methacrylate is a most preferred comonomer.

The comonomer is used in an effective amount to achieve emulsion polymers which, upon dehydration, result in polymer particles having greater latency than polymer particles formed in the absence of the comonomer. The level of comonomer preferably varies from about 20, more preferably about 40, and most preferably about 60, to about 95, more preferably 90, and most preferably 80 weight percent based on the weight of the monomer and comonomer.

The emulsion polymer can be dehydrated to form a polymeric latent initiator by any means that does not deleteriously affect the latency of the initiator. Such means include freeze-drying and spray drying. The polymeric latent initiator can be used as is for one-part adhesive formulations, but is advantageously further processed to remove excess or otherwise unpolymerized monomer. Such processing can be done, for example, by extraction or dialysis.

The systems that are most appropriate for the polymeric latent initiator of the present invention are resins containing at least one strained heterocyclic ring, preferably at least two strained heterocyclic rings. The most commercially significant strained heterocyclics are epoxides and aziridines, with epoxides being especially significant.

In a preferred one-part formulation, the solid polymeric latent curative is added to a mono- or polyepoxide, or mixtures thereof, with or without additional curing agents or initiators. A preferred additional curing agent is dicyandiamide. These formulations may optionally include pigments, such as carbon black; and fillers, such as calcium silicate, talc, fumed silica, aluminum powder, and the like.

Suitable epoxides can be aliphatic, cycloaliphatic, aromatic, or heteroaromatic, and will typically have 2 to 6, more preferably 2 or 3 oxirane rings per molecule. Preferred epoxides include glycidyl-type epoxy resins, such as diglycidyl ethers of polyhydric phenols, and of novolac resins, such as described in "Handbook of Epoxy Resins" by Lee and Neville, McGraw-Hill Book Co., New York (1967). Other examples of epoxides useful in the practice of the present invention are disclosed in U.S. Pat. Nos. 4,101,514 and 3,018,262.

The polymeric latent initiator is used in an effective amount to cure the resin, preferably about 0.1, more preferably about 0.5, and most preferably about 1; to about 20 more preferably about 10, and most preferably about 5 weight percent of active ingredient based on the weight of the total weight of the initiator and the formulation. The term active ingredient is used to mean that part of the polymeric latent curative that initiates the curing of the resin, e.g., 2-methyl imidazole.

The cure-on-demand composition, which includes the polymeric latent initiator and the resin can be cured by heating the composition to a temperature sufficiently high to release the active ingredient from the polymeric latent initiator so that the composition cures rapidly. The composition is preferably heated to a temperature in the range from about 80° C., more preferably from about 100° C., and most preferably from about 150° C., to about 200° C., more preferably 190° C., and most preferably 180° C.

EXAMPLE 1

Preparation of 2-Methyl Imidazole/Poly(Methyl Methacrylate) Particles

Water (410 g), 2-methyl imidazole (14.5 g), and methacrylic acid (15.3 g) are mixed together under nitrogen in a 3-necked, round bottom flask equipped with a heater, a mechanical stirrer, and a reflux condenser. When the mixture is stirred for 15 minutes, Neodol™ 25-9 surfactant (an ethoxylate alcohol, trademark of the Shell Chemical Company, 5.6 g) is added. Sodium formaldehyde sulfoxylate (0.3 g) is added 15 minutes later, and methyl methacrylate (52.5 g) and t-butyl hydroperoxide (0.2 g) are added under nitrogen sparging 15 minutes thereafter. The temperature of the reaction mixture is held at 55° C. for three hours, then raised to 80° C. and held there for 1 hour. A portion of the latex is placed in a dialysis tube (molecular weight cutoff of 6,000 to 8,000 g/mol) for 2 days, then freeze-dried to recover the solid latent initiator. Another portion is simply freeze-dried without dialysis. The latent curatives in this example contain 17.6 weight percent active ingredient.

EXAMPLE 2

Preparation of an Epoxy Adhesive for One-Part Formulations

Diglycidyl ether of bisphenol A (225 g) and carbon black (12 g) are added to a metal can. The mixture is agitated at 5000 RPM for 15 minutes. A 50:50 mixture of diglycidyl ether of bisphenol A and an aliphatic diepoxide of polypropylene oxide (225 g) are added and agitation is continued for another 15 minutes. An epoxy resin containing 40 percent w/w acrylic rubber particles (450 g) is added and agitation is continued for another 15 minutes. This mixture is transferred to a blender and aluminum powder (80 g), calcium silicate filler (175 g), and hydrous magnesium silicate (talc, 80 g) are all added. The mixture is blended for 15 minutes and fumed silica (25 g), BYK™ R-605 polycarboxylic acid amide filler (trademark of Byk Chemie, 15 g), and dicyandiamide (50 g) are added each at 15 minute intervals with continued blending.

EXAMPLE 3A

Shelf Stability of One-Part Epoxy-Adhesive Formulations

The dialyzed solid latent initiator prepared in Example 1 (17.6 g, 3.1 g of active ingredient) is added with stirring to 379 g of an epoxy adhesive prepared as in Example 2. Stirring is continued for 5 minutes. The viscosity of this one-part formulation is monitored at room temperature for 86 days. The viscosity is found to increase from about 180 Pa.s to about 500 Pa.s. When the same amount of nondialyzed solid latent initiator is added under the same conditions to an epoxy adhesive prepared in the same manner, the viscosity increases from about 200 Pa.s to about 500 Pa.s over a period of 20 days, then rises to 1200 Pa.s on the 29th day.

COMPARATIVE EXAMPLE 3B

Shelf Stability of One-Part Epoxy-Adhesive Formulations

2-Methylimidazole without any latex modification (1.76 g) is added with stirring at room temperature to an epoxy adhesive prepared as described in Example 2. The viscosity is found to increase from about 150 Pa.s to 1300 Pa.s in 2 days.

EXAMPLE 4

Lap Shear Strength of a Thermal Cure Adhesive Containing Latent Initiator

The dialyzed solid latent initiator prepared in Example 1 (10 g, 1.76 g of active ingredient) is added with stirring to an epoxy adhesive prepared as in Example 2. Stirring is continued for 5 minutes. Specimens for lap shear strength tests are prepared in accordance with ASTM D-1002-72 using strips having dimensions of 1"×4"×0.063". The lap shear strength for a bond overlap of ½" and a bond thickness of 0.005" is 4200 psi.

What is claimed is:

1. A solid polymeric latent initiator which is a dehydrated aqueous emulsion polymer of a monomer having an ethylenically unsaturated group and a salt of a carboxylic acid and a nitrogen-containing base, wherein the nitrogen-containing base is an initiator capable of opening a strained heterocyclic ring system.

2. The polymeric latent initiator of claim 1 wherein the monomer is a salt of a vinyl carboxylic acid, and a base selected from the group consisting of amines and imidazoles.

3. The polymeric latent initiator of claim 2 wherein the vinyl carboxylic acid is selected from the group consisting of acrylic acid, fumaric acid, itaconic acid, maleic acid, and methacrylic acid.

4. The polymeric latent initiator of claim 3 wherein the base is selected from the group consisting of 2-methyl imidazole, and 2-ethyl-4-methyl imidazole.

5. The latent initiator of claim 4 which further includes in step (a) a comonomer having an ethylenically unsaturated group which is copolymerized with the monomer.

6. The polymeric latent initiator of claim 5 wherein the comonomer is selected from the group consisting of acrylates, vinyl amides, vinyl nitriles, vinyl benzenes, vinyl naphthalenes, N-vinyl carbazoles, and N-vinyl pyrrolidones.

7. The polymeric latent initiator of claim 6 wherein the comonomer is selected from the group consisting of methyl methacrylate, acrylamide, methacrylamide, acrylonitrile, methacrylonitrile, styrene, and α-methyl styrene.

8. The polymeric latent initiator of claim 7 wherein the comonomer is methyl methacrylate.

9. The polymeric latent initiator of claim 8 wherein the monomer is 2-methyl imidazole.

10. The polymeric latent initiator of claim 1 wherein the monomer is a salt of a carboxylic acid and a vinyl imidazole.

11. An aqueous emulsion copolymer of an acrylate or a methacrylate, and a salt of an acrylic acid or a methacrylic acid and an imidazole.

* * * * *